United States Patent
Kretschmer et al.

(10) Patent No.: US 8,205,906 B2
(45) Date of Patent: Jun. 26, 2012

(54) CHILDREN'S SPORT STROLLER

(75) Inventors: Oliver Kretschmer, Sinsheim (DE); Christian Wilke, Rimbach (DE); Jürgen Christmann, Bammental (DE)

(73) Assignee: Otto Bock Healthcare GmbH, Duderstadt (DE)

( * ) Notice: Subject to any disclaimer, the term of this patent is extended or adjusted under 35 U.S.C. 154(b) by 188 days.

(21) Appl. No.: 12/678,731

(22) PCT Filed: Sep. 3, 2008

(86) PCT No.: PCT/DE2008/001487
§ 371 (c)(1),
(2), (4) Date: Mar. 17, 2010

(87) PCT Pub. No.: WO2009/036734
PCT Pub. Date: Mar. 26, 2009

(65) Prior Publication Data
US 2010/0201103 A1    Aug. 12, 2010

(30) Foreign Application Priority Data
Sep. 18, 2007   (DE) .................. 10 2007 044 833

(51) Int. Cl.
*B62B 7/00*       (2006.01)
*B62B 7/14*       (2006.01)

(52) U.S. Cl. ...................... 280/642; 280/650; 280/47.38

(58) Field of Classification Search ................ 280/642, 280/643, 647, 648, 649, 650, 657, 658, 47.38, 280/47.4, 47.41, 79.2
See application file for complete search history.

(56) References Cited

U.S. PATENT DOCUMENTS

| 3,784,252 | A | | 1/1974 | Peterson |
| 5,257,799 | A | | 11/1993 | Cone et al. |
| 5,794,951 | A | * | 8/1998 | Corley et al. .................. 280/30 |
| 6,086,086 | A | | 7/2000 | Hanson et al. |
| 7,367,581 | B2 | * | 5/2008 | Yang ............................. 280/642 |
| 7,377,537 | B2 | * | 5/2008 | Li ................................. 280/650 |
| 2007/0085303 | A1 | * | 4/2007 | Cheng .......................... 280/642 |
| 2008/0303232 | A1 | * | 12/2008 | Chen et al. .................. 280/47.41 |
| 2009/0033066 | A1 | * | 2/2009 | Saville et al. ................. 280/650 |

FOREIGN PATENT DOCUMENTS

| DE | 102004022843 B4 | 12/2004 |
| DE | 202006014928 U1 | 2/2007 |
| EP | 0479132 A1 | 4/1992 |

* cited by examiner

*Primary Examiner* — John R Olszewski
(74) *Attorney, Agent, or Firm* — Holland & Hart LLP

(57) ABSTRACT

The invention relates to a rehabilitation children's sport stroller, comprising a frame (28), a seat (10), and a pivot device (16), which at least in some regions connects the seat (10) to the frame (28) pivotally about a seat pivot axis (S) and comprises a first joint (20) and a second joint (22), which are provided on the seat (10) on mutually opposing sides, wherein the first joint (20) and the second joint (22) can be locked, the first joint (20) comprising a first-joint operating element (40) for releasing the first joint (20). According to the invention, the second joint (22) is connected to the first-joint operating element (40) by means of a push-stable transfer device such that during an actuation of the first-joint operating element (40) the first joint (20) and the second joint (22) are released. Furthermore, the second joint (22) has a second-joint operating element for locking and releasing the second joint (22), wherein the second-joint operating element is connected to the first joint (20) by means of the push-stable transfer device (46) such that the first joint (20) is released when releasing the second joint (22).

17 Claims, 8 Drawing Sheets

CHILDREN'S SPORT STROLLER

Figure 1:
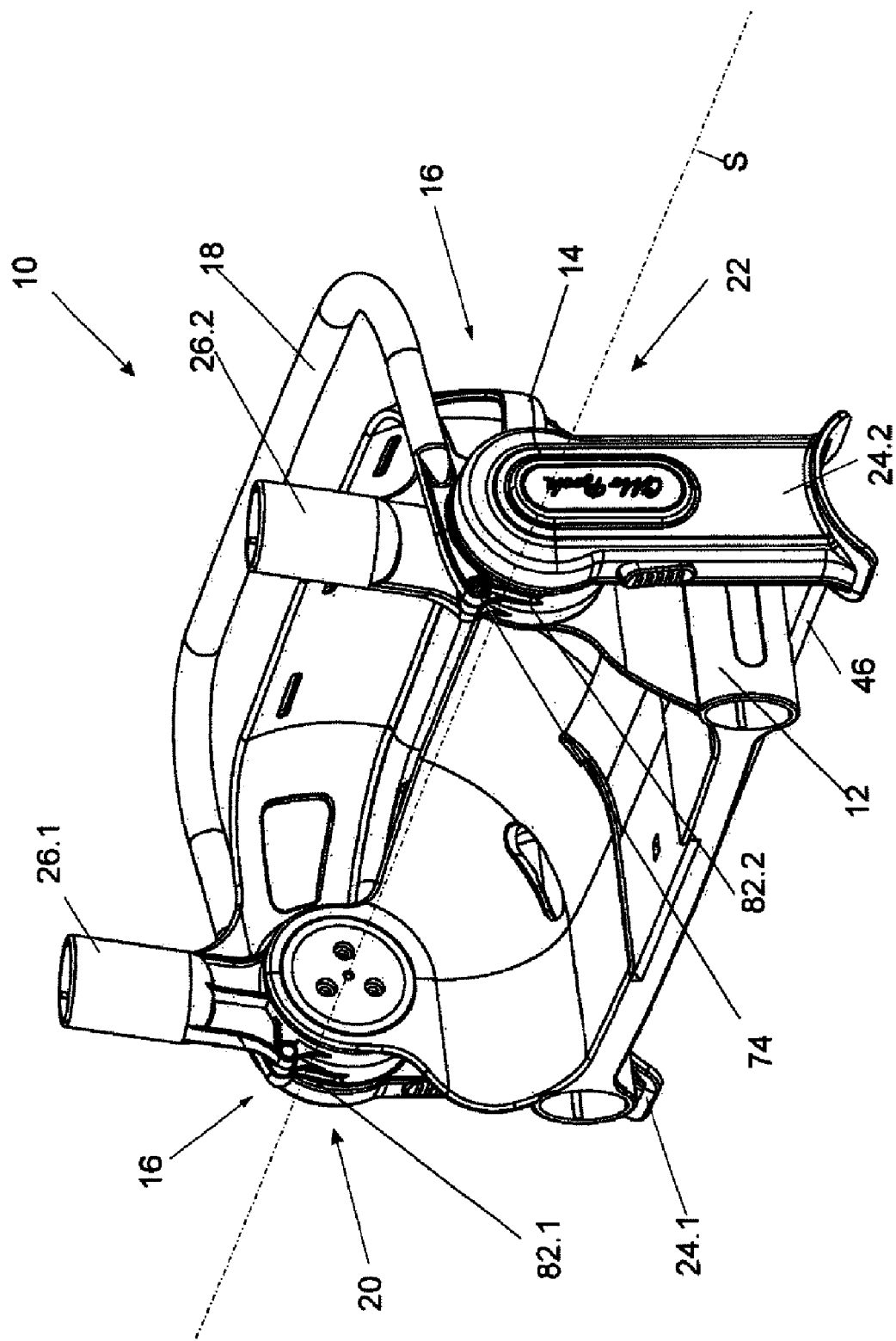

The invention relates to a children's sport stroller, in particular a rehabilitation children's sport stroller, with a frame, with a seat and with a pivoting device which connects the seat, at least in parts, to the frame pivotably about a seat pivot axis and which comprises a first joint and a second joint which are attached to the seat on sides lying opposite one another, the first joint and the second joint being lockable, and the first joint comprising a first-joint operating element for releasing the first joint.

Rehabilitation children's sport strollers of this type are known for transporting children aged from two to six years who have a physical disability or are in rehabilitation after a medical operation. Depending on the child's mood and state of tiredness, it is advantageous to be able to incline the child's back at different angles in relation to the vertical. For this purpose, in known rehabilitation children's sport strollers, the seat is of divided design and comprises a back shell and a seat shell. The back shell is pivotable in relation to the seat shell, so than, by the seat shell being inclined, the child's back is supported at different angles in relation to the vertical.

The disadvantage of rehabilitation children's sport strollers of this type is that, when the back shell is inclined sharply, an obtuse angle may arise between the back shell and the seat shell. This results in a high load upon the child's coccyx.

DE 20 2006 014 928 U1 discloses a children's sport stroller, the seat of which is pivotable by means of a joint having the features of the preamble of claim 1. The disadvantage of the children's sport stroller described is that the operating element for releasing the joints is arranged far apart from the actual joints. This results in laborious operation.

A children's stroller, in which the seat can be displaced by the actuation of a switch, is known from U.S. Pat. No. 6,086,086. DE 10 2004 022 843 B4 discloses a lying insert for children's and/or dolls' stroller frames, in which lying insert the back part is pivotable.

The object on which the invention is based is to specify a rehabilitation children's sport stroller, the seat of which can be locked especially simply and with easy action.

The invention solves the problem by means of a generic children's sport stroller, in particular a generic rehabilitation children's sport stroller according to claim 1.

The invention has the advantage that the seat can be designed so as to be pivotable as a whole about the seat pivot axis. To be precise, a division of the seat into a pivotable back part and a fixed seat part is necessary only so that the child does not slip out of place in an uncontrolled way when the pivoting device is released by both hands. However, since, according to the invention, only a first-joint operating element has to be provided in order to release both the first joint and the second joint, one hand is sufficient for releasing the pivoting device. The child can be restrained with the remaining second hand, and, for example, there is no risk of it tipping over backward in an uncontrolled way. Since the seat can therefore be fastened integrally to the frame by means of the pivoting device, only low forces act upon the coccyx when the back is inclined sharply with respect to the vertical, since the thigh is pivoted by the same amount and thug forms a counterweight.

A further advantage is that the invention can be implemented by mechanically simple means. Malfunctions are thereby largely avoided.

A further advantage is that the child can be held by the hand in the rehabilitation children's sport stroller while the pivoting device is being actuated, so that exactly the pivot angle about the seat pivot axis which conforms to the child's wishes can be set.

Within the scope of the present description, a frame is understood, in particular, to mean a framework to which wheels of the children's sport stroller are also fastened. A seat is understood to mean any device which is designed for directly receiving the weight of a child who is transported in the children's sport stroller. It is not necessary, for this purpose, that the child sits directly on this device. A seat is also understood, in particular, to mean a device onto which, for example, a seat shell or upholstery can be mounted.

A transmission device is to be understood, in particular, as meaning any device which couples the first-joint operating element mechanically to the second joint. This coupling may, for example, be designed to have push stability, turn stability or turn and push stability.

In a preferred embodiment, the transmission device comprises a push rod. A push rod is understood, in particular, to mean any component which transmits a force or a torque from the first-joint operating element to the second joint and which is designed with such mechanical rigidity that is deformed, when the first-joint operating element is actuated, to such a little extent that the second joint is reliably released. It is advantageous, here, that the push rod constitutes an especially simple transmission device which can be produced cost-effectively. Moreover, push rods have very little susceptibility to failure.

Particularly preferably, the push rod is bent arcuately and, in an operating position of the rehabilitation children's sport stroller, is arranged at least partially underneath the seat. What is achieved thereby is that the push rod does not cause disturbance during operation.

Preferably, the first and the second joint are prestressed into a locking position in which the seat is not pivotable in relation to the frame. It is beneficial if the first and the second joint are prestressed independently of one another, for example by means of springs or similar energy accumulators. This ensures that the pivoting device connects the frame to the seat fixedly in terms of rotation, insofar as the first-joint operating element is not actuated.

In a preferred embodiment, the first-joint operating element is designed so that it possesses a securing position and an activating position and the first joint is releasable in the activating position only. Particularly preferably, the first-joint operating element can be pushed from the securing position into the activating position. The pushing direction from the securing position into the activating position preferably runs essentially perpendicularly with respect to the seat pivot axis. An especially simple operation is thus achieved. Alternatively, there may be provision for the first-joint operating element to be rotatable from the securing position into the activating position.

It is preferable that the first joint is designed so that it can be released in that the first-joint operating element is moved in the direction of the seat pivot axis, in particular toward the seat. This results in an especially intuitive operation of the first-joint operating element.

According to a preferred embodiment, there is provision for the push rod to act via a rocker upon a catch element of the second joint. The catch element is arranged so that it blocks the second joint, that is to say prevents a pivoting movement, when the first-joint operating element is not actuated. This results in an especially simple mechanical design of the transmission device.

In order to prevent the pivoting device from being freed automatically, there is provision, according to a preferred embodiment, for the first-joint operating element to be prestressed into the securing position. A breakaway force which is necessary in order to move the first-joint operating element out of the securing position into the activating position is preferably selected so high that it cannot be applied by children aged from two to six years. Alternatively, the breakaway force may also be selected so low that it can be applied with one finger, since children usually do not try out the combination of two successive movements.

In order to make the pivoting device operable from both sides of the children's sport stroller, there is preferably provision for the second joint to possess a second-joint operating element for releasing the second joint, the second-joint operating element being connected to the first joint by means of the transmission device so that, when the second joint is released by actuating the second-joint operating element, the first joint is also released.

Figure 2:
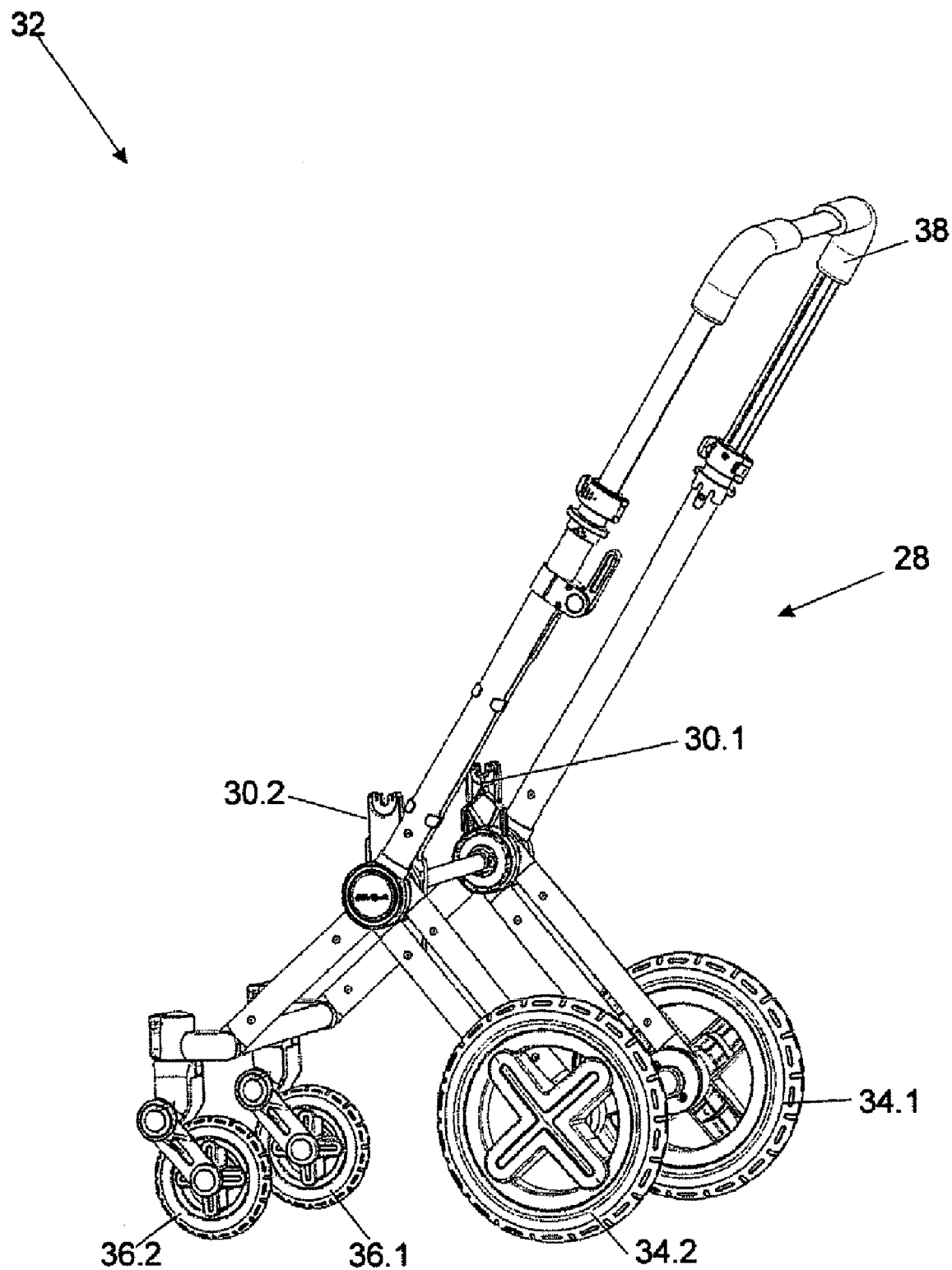
Figure 3:
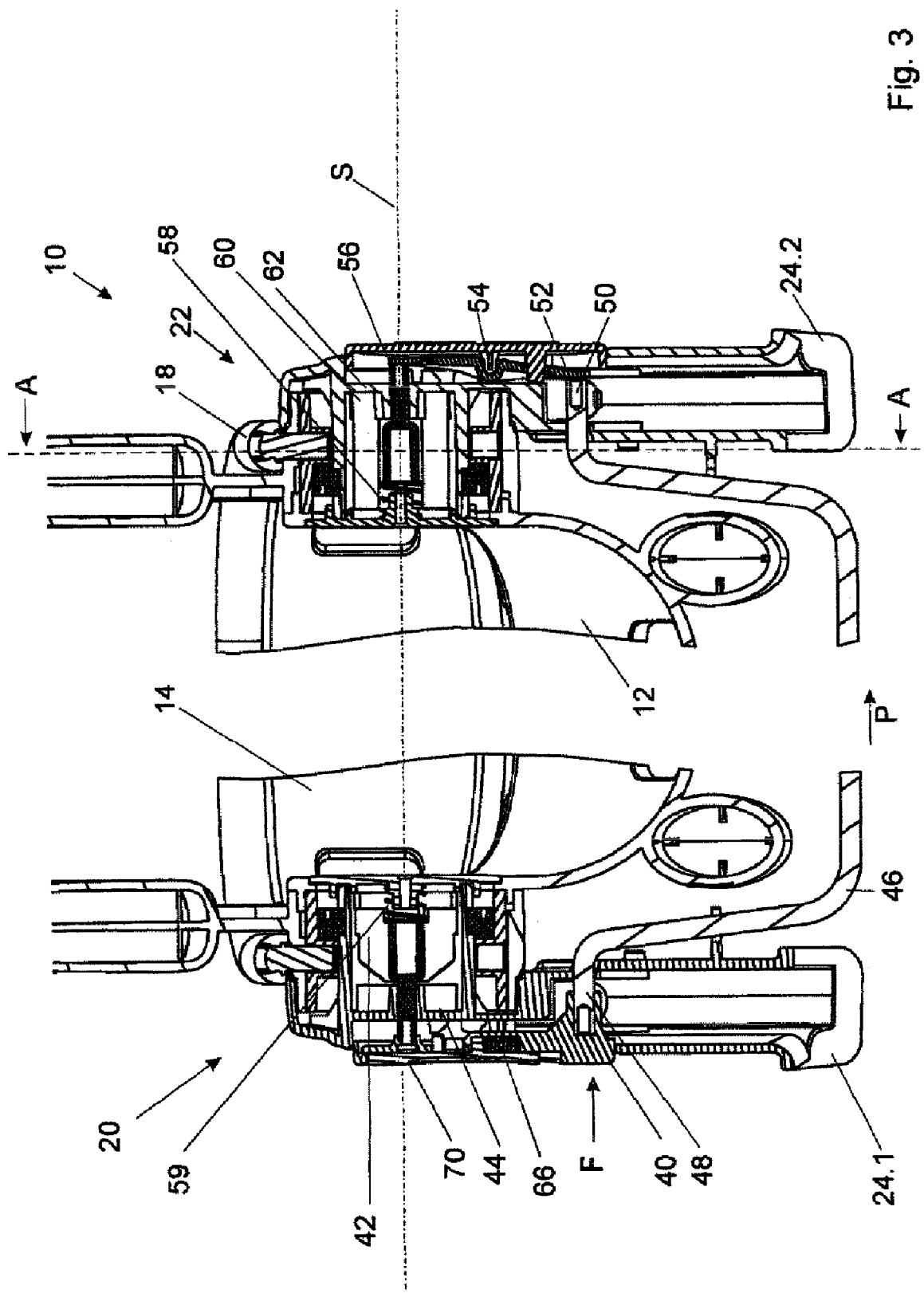
Figure 4:
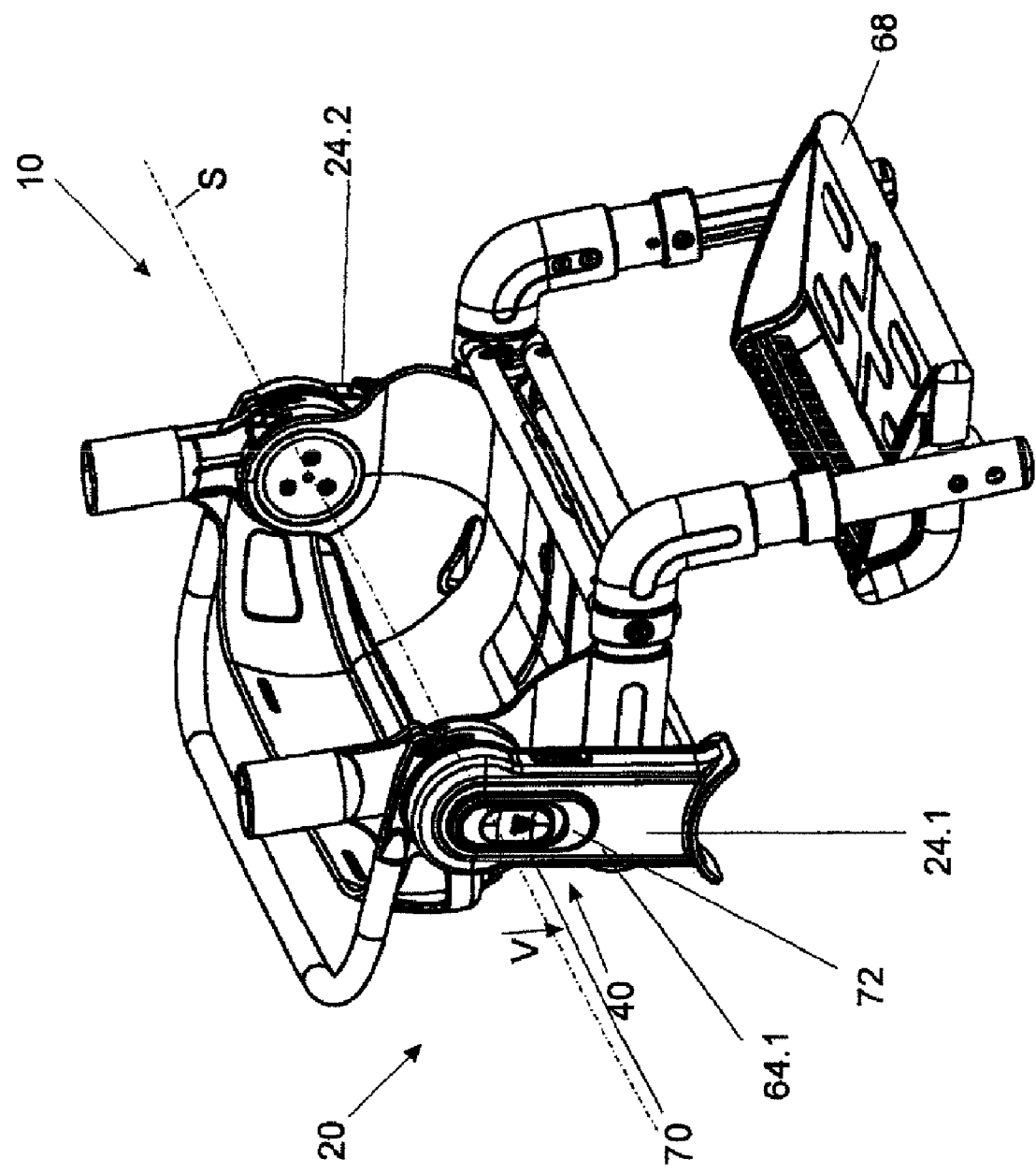
Figure 5:
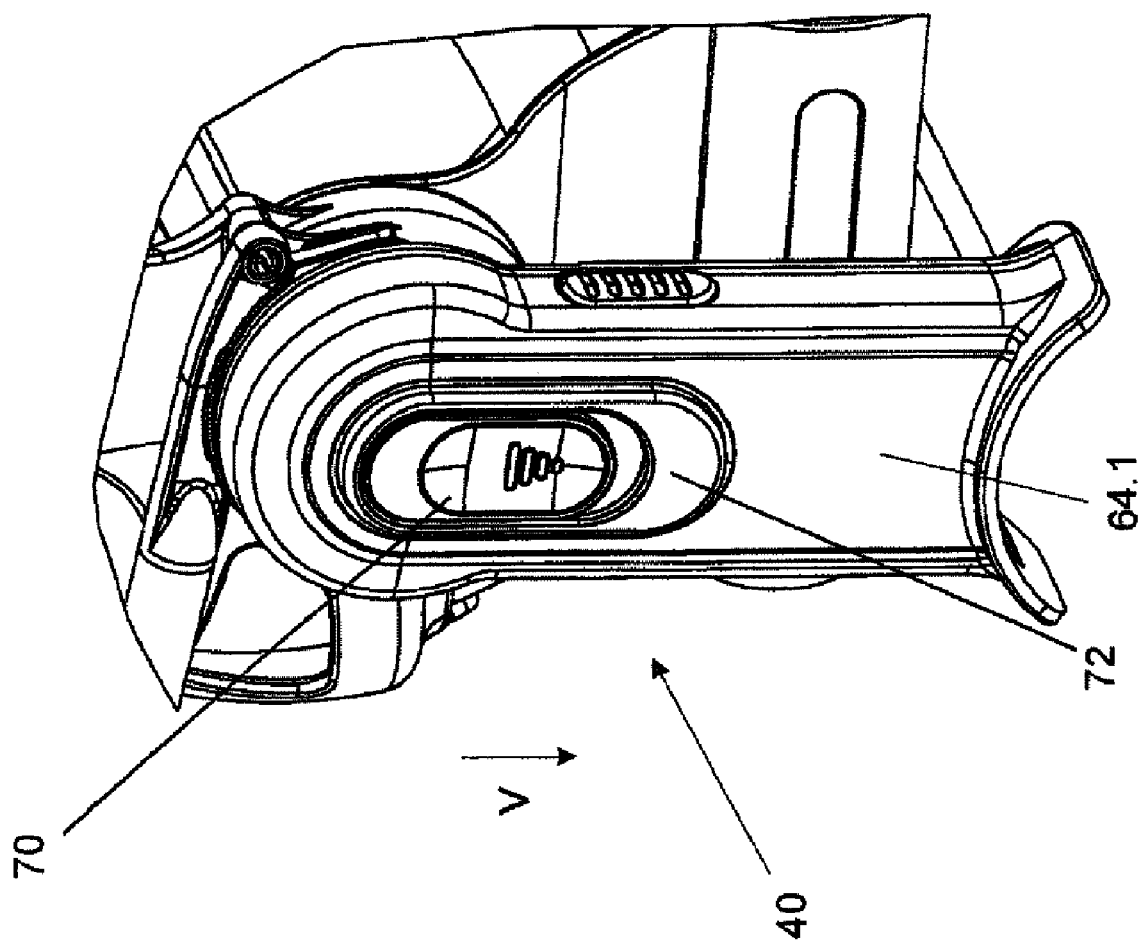
Figure 6:
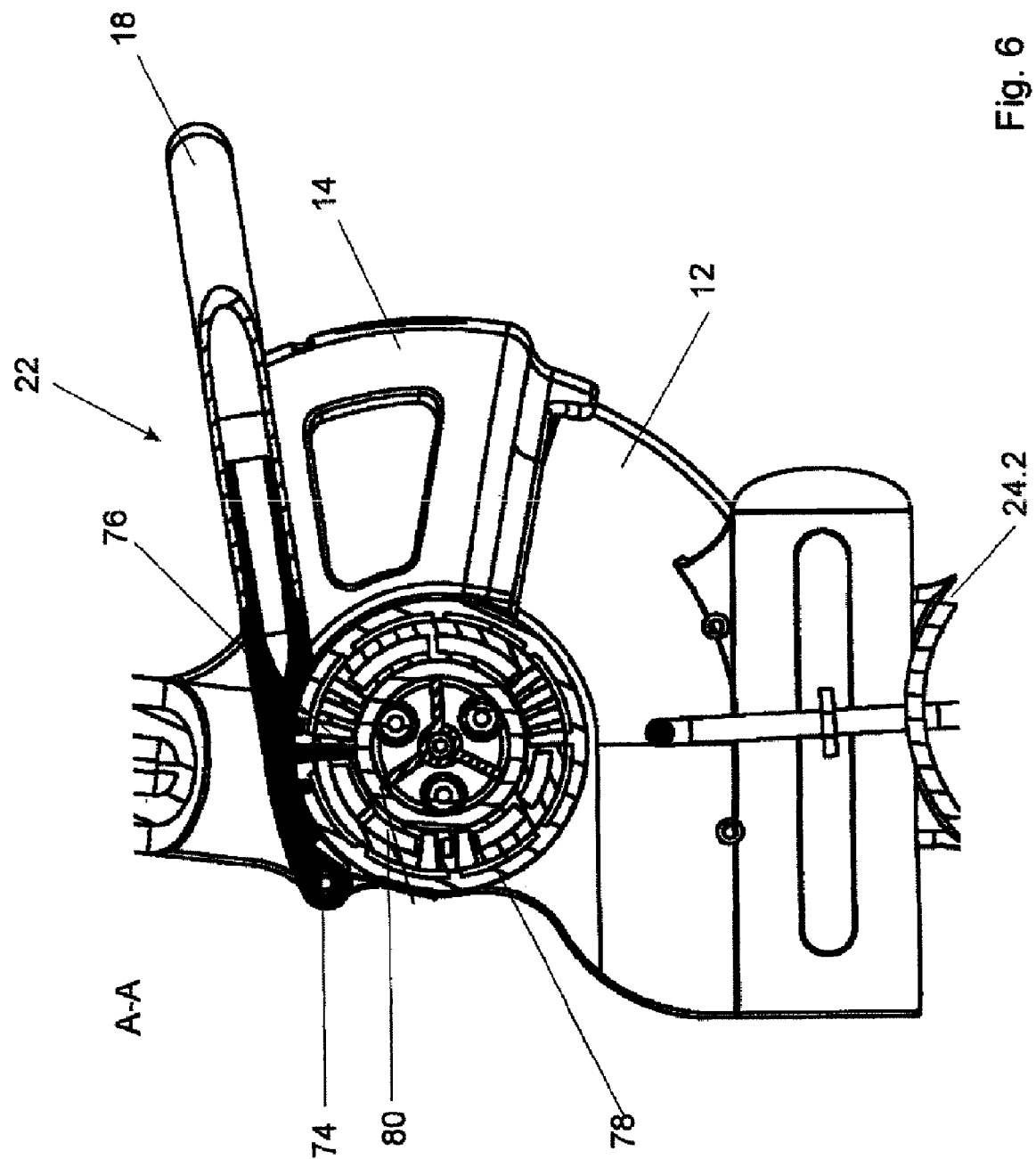
Figure 7:
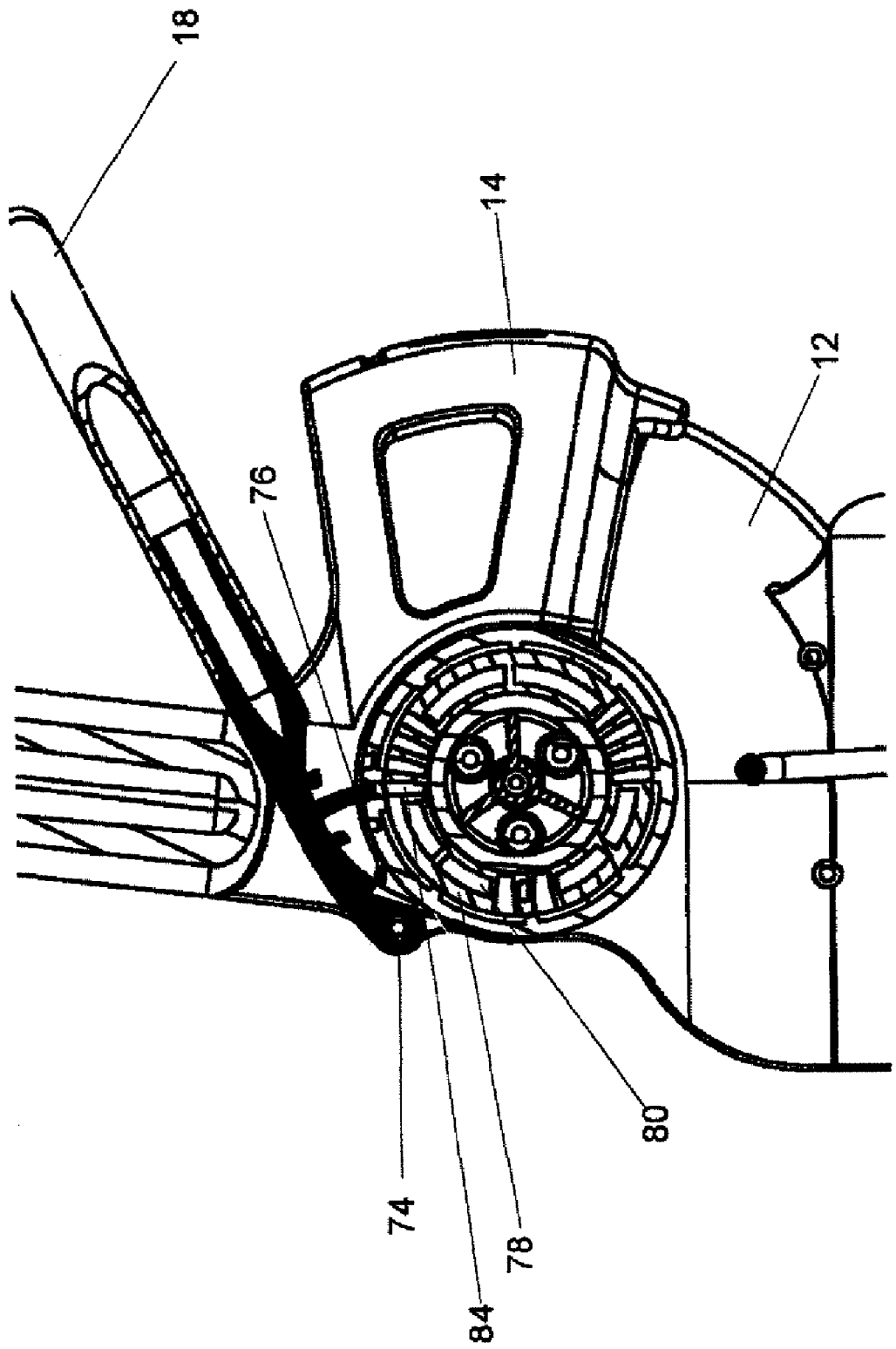
Figure 8:
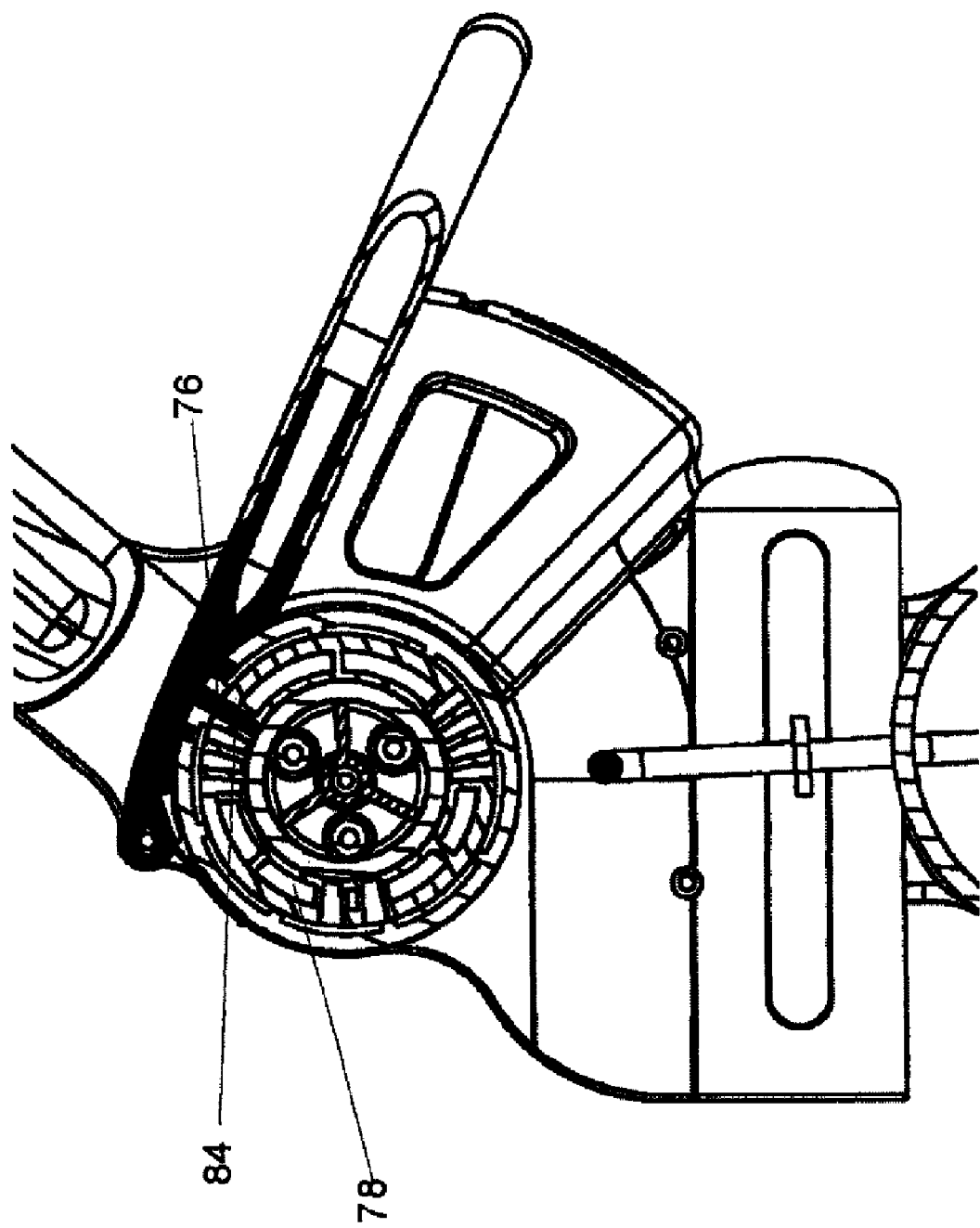

The invention is explained in more detail below with reference to a preferred embodiment. In the drawing:

FIG. 1 shows a perspective view of a seat for a rehabilitation children's sport stroller according to the invention, FIG. 2 shows a frame which can be connected to the seat according to FIG. 1 so as to form the rehabilitation children's sport stroller according to the invention, FIG. 3 shows a diagrammatic sectional view through the seat according to FIG. 1, FIG. 4 shows a perspective of the seat according to FIG. 1, FIG. 5 shows a detail from FIG. 4, FIG. 6 shows a sectional side view through a joint of the pivoting device in a coupling position in which a relative movement between a back shell and a seat shell of the seat is blocked, FIG. 7 shows the sectional view according to FIG. 6 in which the back shell is pivotable with respect to the seat shell, and FIG. 8 shows the sectional view according to FIGS. 6 and 7 in which the back shell is locked in a new position in relation to the seat shell.

FIG. 1 shows a seas 10 which comprises a seat shell 12 and a back shell 14. The seat shell 12 is connected on its two sides to a pivoting device 16, so that it is pivotable about a pivot axis S. The back shell 14 is likewise connected to the pivoting device 16 pivotably about the pivot axis S.

Moreover, a locking bar 18 is fastened to the pivoting device 16 pivotably about the pivot axis S and runs around the back shell 14 so that a person sitting in the seat 10 does not come into contact with the locking bar 18. In FIG. 1, the locking bar 18 is shown in a coupling position in which the back shell 14 is fixed in relation to the seat shell 12. The exact mechanism for this purpose is described further below.

The pivoting device 16 comprises a first joint 20 and a second joint 22 which are arranged on both sides of the seat shell 12 and back shell 14 and which possess respective junction pieces 24.1, 24.2 for connection to a frame. Moreover, the pivoting device 16 comprises junction elements 26.1, 26.2 which are designed so as to have plugged into them a back tube, not depicted, no which is attached a seat covering serving as a back rest.

FIG. 2 shows a frame 28 possessing two reception pieces 30.1, 30.2 which are designed to cooperate with the junction pieces 24.1, 24.2 (cf. FIG. 1) so that the seat 10 can be connected to the frame 28 to form a rehabilitation children's sport stroller 32.

The frame 28 is connected to two rear wheels 34.1, 34.2 and two front wheels 36.1, 36.2. Moreover, the frame 28 comprises a push bar 38, by means of which the rehabilitation children's sport stroller can be pushed.

FIG. 3 shows a diagrammatic cross section through the seat 10, the seat intermediate part irrelevant for the explanation being cut out. The first joint 20 possesses a first-joint operating element 40. When the first-joint operating element 40 is actuated by means of an actuating force F acting toward the seat shell 12 along the pivot axis S, a first runner 42 is displaced inward along the pivot axis S and thus comes out of engagement with a toothing unit 44 which is coupled to the seat shell 12. The runner 42 can consequently be pivoted about the pivot axis S in relation to the toothing unit and therefore in relation to the junction piece 24.1.

Moreover, by the actuating force F being applied to the first-joint operating element 40, a push rod 46 is displaced along the pivot axis S in the direction of an arrow P. For this purpose, a first end 48 of the push rod 46 is fixedly connected to the first-joint operating element 40.

When the push rod 46 moves in the direction of the arrow P, a second end 50, facing away from the first end 48, of she push rod 46 presses onto a rocker 52 which is mounted in relation to the junction piece 24.2 at a bearing point 54. As a result, an end facing away from the push rod 46 with respect to the bearing point pivots toward a second runner 56 and moves the latter inward along the pivot axis S. The term "inward" in this case relates to the seat 10 as a whole.

The second runner 56 is prestressed into a locking position via a spring 58. The first runner 42 is prestressed into a locking position via a spring 59 in the same way. The spring force of the spring 58 indirectly presses the first-joint operating element 40 via the rocker 52 and the push rod 46 into an initial position in which the runners 56, 42 are in the locking position and in which both the first joint 20 and the second joint 22 are locked fixedly in terms of rotation. When the first-joint operating element 40 is acted upon by the actuating force F, a coupling element 60 comes out of engagement with an abutment 62, so that the seat shell 12 and the back shell 14 can pivot about the pivot axis S in a coupled manner in relation to one another.

FIG. 4 shows a perspective view of the seat 10 in which the first-joint operating element 40 can be seen more easily. The first-joint operating element 40 is designed so that it possesses a securing position shown in FIG. 4. In this securing position, the first-joint operating element 40 lies on a housing 64.1 so that it cannot be moved along a pivot axis S even when the actuating force F is applied.

By a securing slide 70 of the first-joint operating element 40 being pushed in a displacement direction V which runs essentially perpendicularly with respect to the pivot axis 5, the first-joint operating element 40 is brought into an activating position in which the first joint 20 and the second joint 22 can be released, as described above, by the actuating force F being applied to a push knob 72 of the first-joint operating element 40. The first-joint operating element 40 is prestressed by means of a helical spring 66 into the securing position shown in FIG. 4. Moreover, FIG. 4 shows a foot support 68 which is mounted on the seat shell 12.

FIG. 5 shows a detail from FIG. 4. It can be seen that the first-joint operating element 40 comprises a securing slide 70 and a push knob 72. When the securing slide 70 is pushed in the displacement direction V, downward in FIG. 5, the first-joint operating element 40 is freed in that both the securing slide 70 and the push knob 72 can subsequently be pressed into the housing 64.1. The securing slide 70 is prestressed in relation to the push knob 72, as described above.

FIG. 6 shows a section along the line A-A according to FIG. 3 through the second joint 22. The locking bar 18 is fastened to the back shell 14 in a journal 74 and engages with a nose 76 through a back-shell sleeve 78, which is formed in one piece on the back shell 14. In a coupling position shown in FIG. 6, moreover, the nose 76 engages through a seat-shell sleeve 80, so that the seat shell 12 is fixed in relation to the back shell 14.

FIG. 7 shows the situation where the locking bar 18 is in a freeing position in which it no longer engages with its nose 76 through the seat-shell sleeve 80. In this freeing position, the seat shell 12 is pivotable in relation to the back shell 14 and can be adjusted.

Leaf springs 82.1, 82.2 have the effect that the nose 76 engages into the radially nearest pocket 84 in the back-shell sleeve 78, so that the seat shell 12 and the back shell 14 are connected to one another anew fixedly in terms of rotation.

FIG. 8 shows the state in which the nose 76 is latched into the pocket 54 in the back-shell sleeve 78, as described above.

List Of Reference Symbols
10 Seat
12 Seat shell
14 Back shell
18 Locking bar
20 First joint
22 Second joint
24.1, 24.2 Junction piece
26.1, 26.2 Junction element
28 Frame
30.1, 30.2 Reception piece
32 Rehabilitation sleeve children's sport stroller sleeve
34 Rear wheel
36 Front wheel
38 Push bar
40 First-joint operating element
42 Runner direction
44 Toothing unit
46 Push rod
48 First end
50 Second end
52 Rocker
54 Bearing point
56 Second runner
58 Spring
59 Spring
60 Catch element
62 Abutment
64 Housing
66 Helical spring
68 Foot support
70 Securing slide
72 Push knob
74 Journal
76 Nose
78 Back-shell sleeve
80 Seat-shell sleeve
82.1, 82.2 Leaf spring Pocket
84 Pocket
S Pivot Axis
F Actuating force
P Arrow
V Displacement direction

The invention claimed is:

1. A rehabilitation children's sport stroller, comprising:
    a. a frame;
    b. a seat;
    c. a pivoting device which
        (i) connects the seat to the frame pivotably about a seat pivot axis, and
        (ii) comprises a first joint and a second joint which are attached to the seat on sides lying opposite one another,
        (iii) the first joint and the second joint being lockable;
    d. the first joint comprising a first-joint operating element for releasing the first joint;
    e. wherein the second joint is connected to the first-joint operating element with a rigid transmission device configured to transfer an axial directed force when pushed axially, so that the first joint and the second joint are released when the first-joint operating element is actuated;
    f. wherein the second joint possesses a second-joint operating element for locking and releasing the second joint, the second-joint operating element being connected to the first joint with the transmission device, so that, when the second joint is released, the first joint is released;
    g. wherein the seat is integrally fastened to the frame with the pivoting device.

2. The rehabilitation children's sport stroller as claimed in claim 1, wherein the transmission device comprises a push rod.

3. The rehabilitation children's sport stroller as claimed in claim 1, wherein the first joint and the second joint are pre-stressed into a locking position.

4. A rehabilitation children's sport stroller, comprising:
    a. a frame;
    b. a seat;
    c. a pivoting device which
        (i) connects the seat to the frame pivotably about a seat pivot axis, and
        (ii) comprises a first joint and a second joint which are attached to the seat on sides lying opposite one another,
        (iii) the first joint and the second joint being lockable;
    d. the first joint comprising a first-joint operating element for releasing the first joint;
    e. wherein the second joint is connected to the first-joint operating element with a transmission device configured to transfer an axial directed force when pushed axially, so that the first joint and the second joint are released when the first-joint operating element is actuated;
    f. wherein the second joint possesses a second-joint operating element for locking and releasing the second joint, the second-joint operating element being connected to the first joint with the transmission device, so that, when the second joint is released, the first joint is released;
    g. wherein the first-joint operating element is designed so that
        (i) first-joint operating element possesses a securing position and an activating position, and
        (ii) the first joint can be released in the activating position only;
    h. wherein the first-joint operating element can be pushed from the securing position into the activating position;
    i. wherein the first-joint operating element comprises
        (i) a push knob, and
        (ii) a securing slide which is attached to the push knob and which can be pushed from the securing position into the activating position essentially perpendicularly with respect to the pivot axis.

5. The rehabilitation children's sport stroller as claimed in claim 4, wherein the first joint is designed to be releasable with a translational movement of the first-joint operating element located in the activating position in the direction of the seat pivot axis.

6. The rehabilitation children's sport stroller as claimed in claim 4, wherein the transmission device comprises a push rod, and the push rod acts via a rocker upon a catch element of the second joint.

7. The rehabilitation children's sport stroller as claimed in claim 4, wherein the first-joint operating element is prestressed into the securing position.

8. A rehabilitation children's sport stroller, comprising
a. a frame;
b. a seat;
c. a pivoting device which
   (i) connects the seat, at least in parts, to the frame pivotably about a seat pivot axis and
   (ii) comprises a first joint and a second joint which are attached to the seat on sides lying opposite one another, the first joint and the second joint being lockable,
d. the first joint comprising a first-joint operating element for releasing the first joint,
e. wherein the second joint is connected to the first-joint operating element with a transmission device having push stability, so that the first joint and the second joint are released when the first-joint operating element is actuated, and
f. wherein the second joint possesses a second-joint operating element for locking and releasing the second joint, the second-joint operating element being connected to the first joint with the transmission device having push stability, so that, when the second joint is released, the first joint is released,
g. wherein the transmission device comprises a push rod that is bent arcuately and, in an operating position of the rehabilitation children's sport stroller, runs at least partially underneath the seat.

9. The rehabilitation children's sport stroller as claimed in claim 8, wherein the first joint and the second joint are prestressed into a locking position.

10. The rehabilitation children's sport stroller as claimed in claim 8, wherein the first-joint operating element is designed so that
   (a) the first-joint operating element possesses a securing position and an activating position, and
   (b) the first joint can be released in the activating position only.

11. The rehabilitation children's sport stroller as claimed in claim 10, wherein the first-joint operating element can be pushed from the securing position into the activating position.

12. The rehabilitation children's sport stroller as claimed in claim 11, wherein the first-joint operating element comprises
   (a) a push knob and
   (b) a securing slide which is attached to the push knob and which can be pushed from the securing position into the activating position essentially perpendicularly with respect to the pivot axis.

13. The rehabilitation children's sport stroller as claimed in claim 10, wherein the first joint is designed to be releasable with a translational movement of the first-joint operating element located in the activating position in the direction of the seat pivot axis.

14. The rehabilitation children's sport stroller as claimed in claim 13, wherein the push rod acts via a rocker upon a catch element of the second joint.

15. The rehabilitation children's sport stroller as claimed in claim 14, wherein the first-joint operating element is prestressed into the securing position.

16. The rehabilitation children's sport stroller as claimed in claim 8, wherein
   (a) the seat comprises a seat shell, a back shell and a locking bar,
   (b) the pivoting device being designed so that the locking bar has a coupling position in which the back shell is fixed in relation to the seat shell, and a freeing position in which the back shell is pivotable in relation to the seat shell.

17. The rehabilitation children's sport stroller as claimed in claim 16, wherein the pivoting device is designed so that, when
   the locking bar is in the coupling position and
   the first-joint operating element is actuated,
   the seat shell and the back shell are pivotable about the pivot axis in the state fixed in relation to one another.

* * * * *